US010920443B2

(12) United States Patent
Rabaut et al.

(10) Patent No.: US 10,920,443 B2
(45) Date of Patent: Feb. 16, 2021

(54) AUXILIARY DEVICE AND METHOD FOR REALIZING A BOLT CONNECTION BETWEEN CONNECTING FLANGES OF A FIRST AND A SECOND STRUCTURE

(71) Applicant: DEME Offshore Holding N.V., Zwijndrecht (BE)

(72) Inventors: Dieter Wim Jan Rabaut, Ghent (BE); Kevin Ludo van de Velde, Bevel (BE); Mathieu Holvoet, Kortrijk (BE)

(73) Assignee: DEME Offshore BE NV, Zwijndrecht (BE)

( * ) Notice: Subject to any disclaimer, the term of this patent is extended or adjusted under 35 U.S.C. 154(b) by 0 days.

(21) Appl. No.: 16/568,713

(22) Filed: Sep. 12, 2019

(65) Prior Publication Data
US 2020/0087945 A1 Mar. 19, 2020

(30) Foreign Application Priority Data

Sep. 13, 2018 (BE) .................................. 2018/5629

(51) Int. Cl.
*F03D 13/25* (2016.01)
*E04H 12/34* (2006.01)
*E04H 12/08* (2006.01)

(52) U.S. Cl.
CPC ......... *E04H 12/085* (2013.01); *E04H 12/342* (2013.01); *F03D 13/25* (2016.05)

(58) Field of Classification Search
CPC ..... E04H 12/085; E04H 12/342; F03D 13/25; F03D 13/10; B63B 2035/446; F16B 2001/0092; F16B 5/02

USPC .......................... 52/122.1, 123.1, 126.7, 292
See application file for complete search history.

(56) References Cited

U.S. PATENT DOCUMENTS

| 2,327,869 | A | * | 8/1943 | Carlson | ..................... E04H 9/10 52/122.1 |
| 4,052,045 | A | | 10/1977 | Shaddix | |
| 5,466,105 | A | | 11/1995 | McKay et al. | |
| 5,533,835 | A | * | 7/1996 | Angelette | ............... E02D 27/42 405/229 |
| 5,632,583 | A | | 5/1997 | Schneider et al. | |
| 5,800,094 | A | * | 9/1998 | Jones | ..................... E02D 35/00 254/133 R |

(Continued)

FOREIGN PATENT DOCUMENTS

| EP | 2615315 A1 | 7/2013 |
| EP | 2636899 A1 | 11/2013 |

(Continued)

*Primary Examiner* — Brent W Herring
(74) *Attorney, Agent, or Firm* — The Webb Law Firm (57) ABSTRACT

Described is an auxiliary device for realizing a bolt connection between connecting flanges, placed against each other, of a first and a second structure. The auxiliary device includes a support body provided with a number of receiving positions for a bolt. The receiving positions are aligned with corresponding bolt holes in the connecting flanges to be placed against each other. The auxiliary device further includes a moving mechanism with which the support body can be moved toward the connecting flanges which are arranged against each other so that a number of bolts arranged in the receiving positions are arranged substantially simultaneously through the bolt holes. Also described is a corresponding method.

16 Claims, 6 Drawing Sheets

(56) References Cited

U.S. PATENT DOCUMENTS

| | | | | |
|---|---|---|---|---|
| 5,839,239 A * | 11/1998 | Jang | ............................ | B66F 7/20 52/123.1 |
| 6,079,905 A * | 6/2000 | Ruiz | ........................ | E02D 27/48 405/229 |
| 6,439,807 B1 | 8/2002 | Wijsman | | |
| 6,503,024 B2 * | 1/2003 | Rupiper | ................... | E02D 27/48 405/229 |
| 6,539,685 B2 * | 4/2003 | Bell | ......................... | E02D 35/00 405/229 |
| 7,004,683 B1 * | 2/2006 | Rupiper | ..................... | E02D 5/56 405/229 |
| 7,182,316 B2 * | 2/2007 | Sykes | ...................... | E02D 35/00 254/85 |
| 7,374,369 B2 * | 5/2008 | Jakubowski | ............. | E02D 27/42 405/244 |
| 7,533,505 B2 * | 5/2009 | Henderson | ............... | E02D 27/42 405/228 |
| 7,614,200 B2 * | 11/2009 | Wobben | ................... | E02D 27/42 248/125.8 |
| 7,707,797 B2 * | 5/2010 | Henderson | ............... | F03D 13/22 52/745.17 |
| 7,744,316 B2 * | 6/2010 | Kaufman | ............... | E02D 35/005 405/230 |
| 7,900,406 B2 * | 3/2011 | Wobben | ................... | F03D 13/22 52/126.1 |
| 8,887,451 B2 * | 11/2014 | Gregory | ................. | E04G 23/065 52/126.6 |
| 9,003,721 B1 * | 4/2015 | Jensen | ................... | E02D 27/425 52/126.6 |
| 9,579,757 B2 * | 2/2017 | Jensen | ..................... | B23P 19/12 |
| 10,422,323 B2 * | 9/2019 | Sandvad | ............... | E02D 27/425 |
| 2002/0062622 A1 * | 5/2002 | Bell | ......................... | E02D 35/00 52/741.15 |
| 2004/0131428 A1 * | 7/2004 | Henderson | ............. | E04H 12/085 405/233 |
| 2004/0244313 A1 * | 12/2004 | Baker | ..................... | E02D 35/00 52/122.1 |
| 2005/0172427 A1 * | 8/2005 | Sykes | ..................... | E02D 35/00 14/75 |
| 2005/0201848 A1 | 9/2005 | Reilly | | |
| 2008/0232906 A1 * | 9/2008 | Henderson | ............. | E02D 27/42 405/233 |
| 2009/0044482 A1 * | 2/2009 | Tooman | ................. | E04H 12/085 52/699 |
| 2011/0138706 A1 * | 6/2011 | Voss | ......................... | F03D 13/22 52/173.1 |
| 2013/0183118 A1 | 7/2013 | Cooper | | |
| 2013/0312241 A1 * | 11/2013 | Jensen | .................... | F03D 13/10 29/464 |
| 2015/0204312 A1 * | 7/2015 | Patterson | .............. | E04H 12/085 285/412 |
| 2015/0211251 A1 * | 7/2015 | Garcia Maestre | ...... | E04H 12/34 52/126.7 |
| 2015/0376857 A1 * | 12/2015 | Clifton | ................. | E04H 12/2269 52/292 |
| 2019/0003459 A1 * | 1/2019 | Meyer | ..................... | B66C 1/108 |
| 2019/0030665 A1 * | 1/2019 | Johst | ..................... | B23P 19/067 |
| 2019/0084183 A1 * | 3/2019 | Phuly | ..................... | F03D 13/22 |

FOREIGN PATENT DOCUMENTS

| | | |
|---|---|---|
| WO | 2005090800 A1 | 9/2005 |
| WO | 2017168176 A1 | 10/2017 |

\* cited by examiner

AUXILIARY DEVICE AND METHOD FOR REALIZING A BOLT CONNECTION BETWEEN CONNECTING FLANGES OF A FIRST AND A SECOND STRUCTURE

CROSS-REFERENCE TO RELATED APPLICATION

This application claims priority to Belgian Patent Application No. 2018/5629 filed Sep. 13, 2018, the disclosure of which is hereby incorporated by reference in its entirety.

TECHNICAL FIELD OF THE INVENTION

The invention relates to an auxiliary device for realizing a bolt connection between connecting flanges of a first and a second structure, which are placed against each other. The invention likewise relates to a method for efficiently realizing with the device a bolt connection between connecting flanges of a first and a second structure, which are placed against each other. The invention relates particularly to an auxiliary device and method for realizing a bolt connection between connecting flanges, placed against each other, of a support structure for a wind turbine mast which is connected to the deck of a vessel and of a wind turbine mast, for the purpose of seafastening the wind turbine mast in erected state.

The invention will be elucidated below with reference to the seafastening of an offshore wind turbine, for which the invention is particularly suitable. This does not however imply that the invention is limited hereto, and the auxiliary device and corresponding method can likewise be applied to connect connecting flanges of any other combination of a first and second structure. Examples of suitable applications comprise seafastening and transport of wind turbine masts or other wind turbine components, seafastening and transport of foundations or parts of foundations suitable for wind turbines and, if desired, of other components with a flange which must be seafastened and transported to an offshore location.

BACKGROUND OF THE INVENTION

An offshore wind turbine is usually placed on a support structure anchored to a seabed, for instance in the form of a monopile, transition piece as part of a foundation, lattice structure or jacket arranged in the seabed. In order to enable the wind turbine mast to be connected to the support structure or to other structures an underside of the mast is often provided with a connecting flange in which a number of bolt holes is arranged, distributed along a peripheral direction of the connecting flange. For the purpose of transporting a wind turbine over sea the wind turbine has to be firmly connected, at least temporarily, to the deck of a vessel, and particularly to a support structure present on the deck. This seafastening is enabled by placing the connecting flange of the wind turbine against a connecting flange of the support structure and connecting it thereto by arranging bolts through aligned openings in the two flanges and securing them with a counter-nut. Such a method of seafastening according to the prior art is laborious and time-consuming.

SUMMARY OF THE INVENTION

The invention has for its object, among others, to provide an auxiliary device and corresponding method which at least partially prevent the above stated and other prior art drawbacks.

According to the invention, this object is achieved by providing an auxiliary device for realizing a bolt connection between connecting flanges of a first and a second structure, which are placed against each other, which auxiliary device comprises a support body provided with a number of receiving positions for a bolt, wherein the receiving positions are aligned with corresponding bolt holes in the connecting flanges to be placed against each other, and wherein the auxiliary device further comprises moving means for moving the support body toward the connecting flanges which are arranged against each other so that a number of bolts arranged in the receiving positions are arranged substantially simultaneously (or collectively) through the bolt holes. With the invented auxiliary device the working time in realizing a bolt connection can be markedly reduced.

The invention is particularly suitable for seafastening of a wind turbine (or a component of such a wind turbine, such as for instance a wind turbine mast). According to an embodiment of the invention, an auxiliary device is provided here, wherein the first structure comprises a support structure for a wind turbine mast and the second structure a wind turbine mast. A support structure for a wind turbine mast is also referred to as a tower seafastening grillage and comprises for instance an annular structure provided with a connecting flange for connecting to a connecting flange of a wind turbine mast.

According to an embodiment of the invention, an auxiliary device is provided, wherein the support structure is connected to the deck of a vessel.

According to the invention, the support body is provided with a number of receiving positions for a bolt, aligned with corresponding bolt holes in the connecting flanges to be placed against each other. In order to realize this feature the auxiliary device, and particularly the support body of the auxiliary device, is in a suitable embodiment received in the first structure, for instance in a support structure for a wind turbine (component).

A practical embodiment of the invention provides an auxiliary device wherein the support body of the auxiliary device is connected via the moving means to the first structure. The support body can thus be moved relative to the first structure, preferably up and downward, and thereby counter to the force of gravity or along with the force of gravity. In such an embodiment a first part of the moving means can be connected to the support body, and a second part of the moving means can be connected to the first structure, for instance a support structure for a wind turbine (component). The second part of the moving means is preferably connected fixedly to the first structure, while the first part is movable relative to the second part and thus also relative to the first structure. The first and second parts of the moving means can then be moved relative to each other.

According to an embodiment of the invention, an auxiliary device is provided, wherein a first part of the moving means, this first part being connected to the support body, can be moved relative to a second part of the moving means under the influence of a mechanically, electrically, pneumatically and/or hydraulically generated force. The second part is preferably connected fixedly to the first structure, and the movement is preferably counter to the force of gravity or along with the force of gravity.

According to a practical embodiment of the invention, the moving means comprise a gear transmission which can be operated manually or mechanically. A suitable gear transmission can comprise a second part in the form of a box beam mounted on a wall of the first structure, a first part in the form of a gear rack which runs in vertical direction to a position against the support body and is connected thereto, and a gearbox in which is received a gear driven with a suitable drive means. The drive can move the gear rack and therefore also the support body up and downward in vertical direction, so counter to the force of gravity or along with the force of gravity, relative to the box beam mounted on the first structure. This movement can of course also be made possible in other manner, for instance under the influence of an electrically, pneumatically and/or hydraulically generated force, for instance with hydraulic piston cylinders. A piston cylinder driven in said manner is then mounted between a second part mounted on a wall of the first structure and a first part which makes contact with the support body, for instance a piston rod of the piston cylinder.

According to another embodiment of the invention, an auxiliary device is provided which is further provided with guide means for keeping the receiving positions aligned, during movement of the support body, with the corresponding bolt holes in the connecting flanges to be placed against each other. This achieves that, during upward or downward movement of the support body, it will be difficult for this support body to become jammed or come to lie at an angle relative to a contact surface formed by the connecting flanges placed against each other, or an upper or lower surface of these connecting flanges.

According to the invention, it is possible to apply one support body, all this depending on the form of the connecting flanges and/or of the first and second structure. It is however also possible to apply a plurality of support bodies, each of these manipulating some of the bolts to be arranged.

According to a particular embodiment of the invention, an auxiliary device is provided, wherein the support body takes substantially the form of a circle segment for co-action with substantially circular connecting flanges. The number of segments can for instance amount to 1 to 10, more preferably 2 to 6, and most preferably 3 to 4. These ranges include the end points. These segments preferably cover a substantially whole circumference of the connecting flanges.

According to yet another embodiment of the invention, an auxiliary device is provided, wherein the support body extends substantially in a plane and the receiving positions are configured to receive a bolt protruding from the plane, more preferably a bolt running perpendicularly of the plane.

Another aspect of the invention relates to a method for realizing a bolt connection between connecting flanges, placed against each other, of a first and a second structure, comprising of providing an auxiliary device according to any one of the foregoing claims, placing connecting flanges of the first and second structure against each other, aligning the receiving positions of the support body with corresponding bolt holes in the connecting flanges placed against each other, and moving the support body toward the connecting flanges, arranged against each other, with the moving means, so that a number of bolts arranged in the receiving positions is arranged substantially simultaneously through the bolt holes.

According to an embodiment of the invention, a method is provided, wherein the support body is connected via the moving means to the first structure.

According to an embodiment of the invention, a method is provided, wherein a first part of the moving means, which is connected to the support body, is moved relative to a second part of the moving means under the influence of a mechanically, electrically, pneumatically and/or hydraulically generated force.

According to an embodiment of the invention, a method is provided, wherein the first part of the moving means, which is connected to the support body, is moved relative to the second part of the moving means by means of a gear transmission.

According to an embodiment of the invention, a method is provided, wherein during movement of the support body the receiving positions are kept aligned with the corresponding bolt holes in the connecting flanges, which are placed against each other, using guide means.

According to an embodiment of the invention, a method is provided, wherein the support body takes substantially the form of a circle segment for co-action with substantially circular connecting flanges.

According to an embodiment of the invention, a method is provided, wherein the support body extends substantially in a plane and a bolt protruding from the plane, more preferably a bolt running perpendicularly of the plane, is received in the receiving positions.

According to an embodiment of the invention, a method is provided, wherein the first structure comprises a support structure for a wind turbine mast, and the second structure a wind turbine mast.

According to an embodiment of the invention, a method is provided, wherein the support structure is connected to the deck of a vessel.

The auxiliary device and method according to the invention are particularly suitable for rapid and efficient seafastening of a wind turbine (component) for the purpose of carrying the wind turbine (component) to an offshore position.

The embodiments of the invention described in this patent application can be combined in any possible combination of these embodiments, and each embodiment can individually form the subject-matter of a divisional patent application.

BRIEF DESCRIPTION OF THE FIGURES

The invention will now be further elucidated on the basis of the following figures and description of a preferred embodiment, without the invention otherwise being limited thereto. In the figures.

DESCRIPTION OF EXEMPLARY EMBODIMENTS

Figure 1:
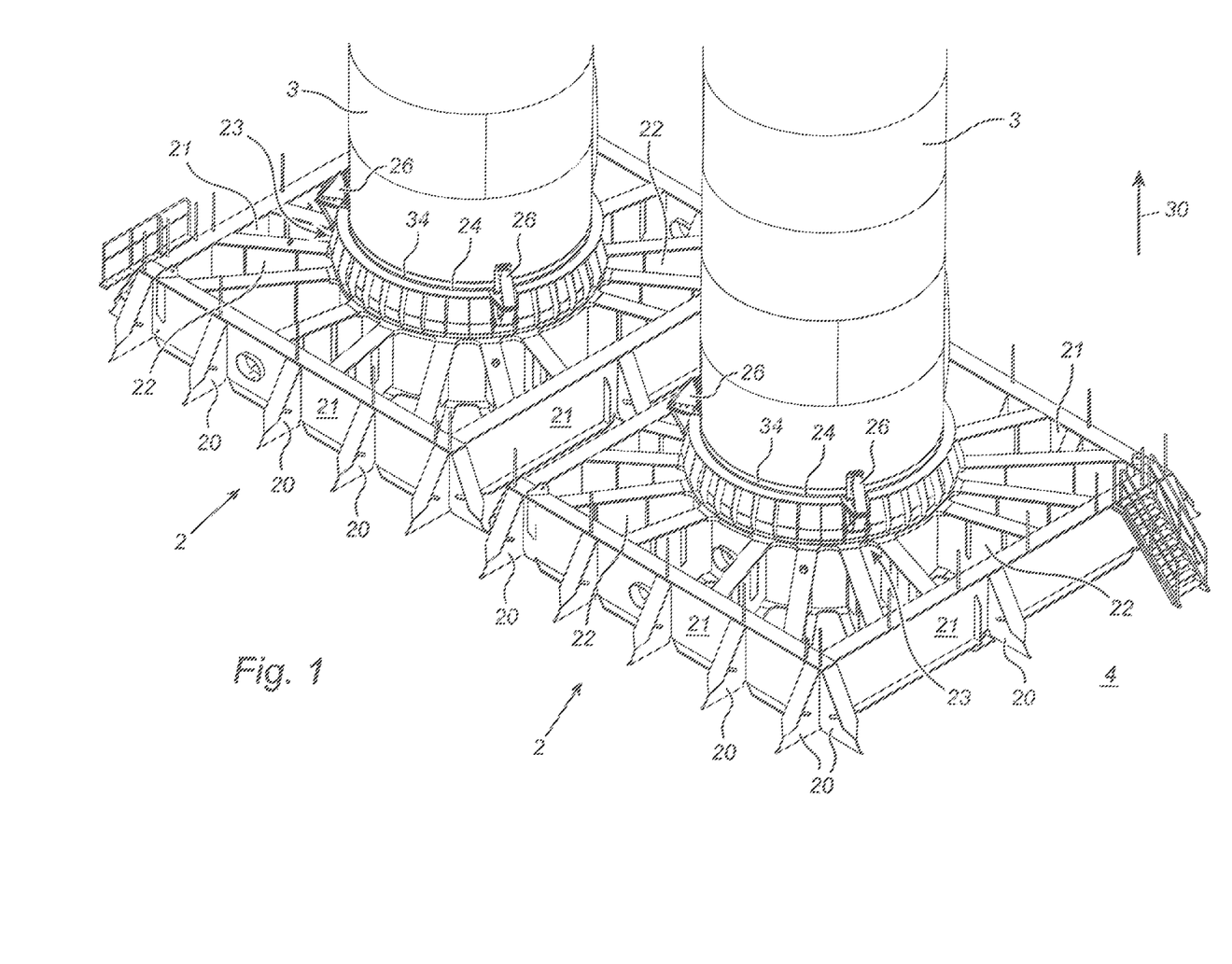
FIG. 1 is a schematic perspective view of a support structure for seafastening of wind turbines wherein an auxiliary device according to the invention is applied.

Referring to FIG. 1, two support structures 2 connected to the deck 4 of an installation vessel (not further shown) are shown for seafastening of two wind turbine masts 3. Support structures 2 are for instance secured to deck 4 by means of a welded connection. Each support structure 2 is embodied as a lattice structure reinforced with shores 20 and comprising a series of side plates 21 arranged in a square, between which are arranged strengthening partitions 22 which run radially inward and support a centrally disposed seafastening ring 23.

Secured to a connecting flange 24 of each seafastening ring 23 using a large number of bolts is a corresponding connecting flange 34 of a wind turbine mast 3. A wind turbine 3 anchored to a support structure 2 thus extends substantially in a direction 30 perpendicularly of the plane of deck 5. Connecting flanges 24 and 34 are moved toward each other by taking up a wind turbine 3 with suitable lifting gear, moving it in the direction of support structure 2 and lowering it onto this structure. Arranged on seafastening ring 23 in a peripheral direction 25 of connecting flange 24 are three guide plates 26 which facilitate the moving toward each other of connecting flanges 24 and 34.

Figure 2:
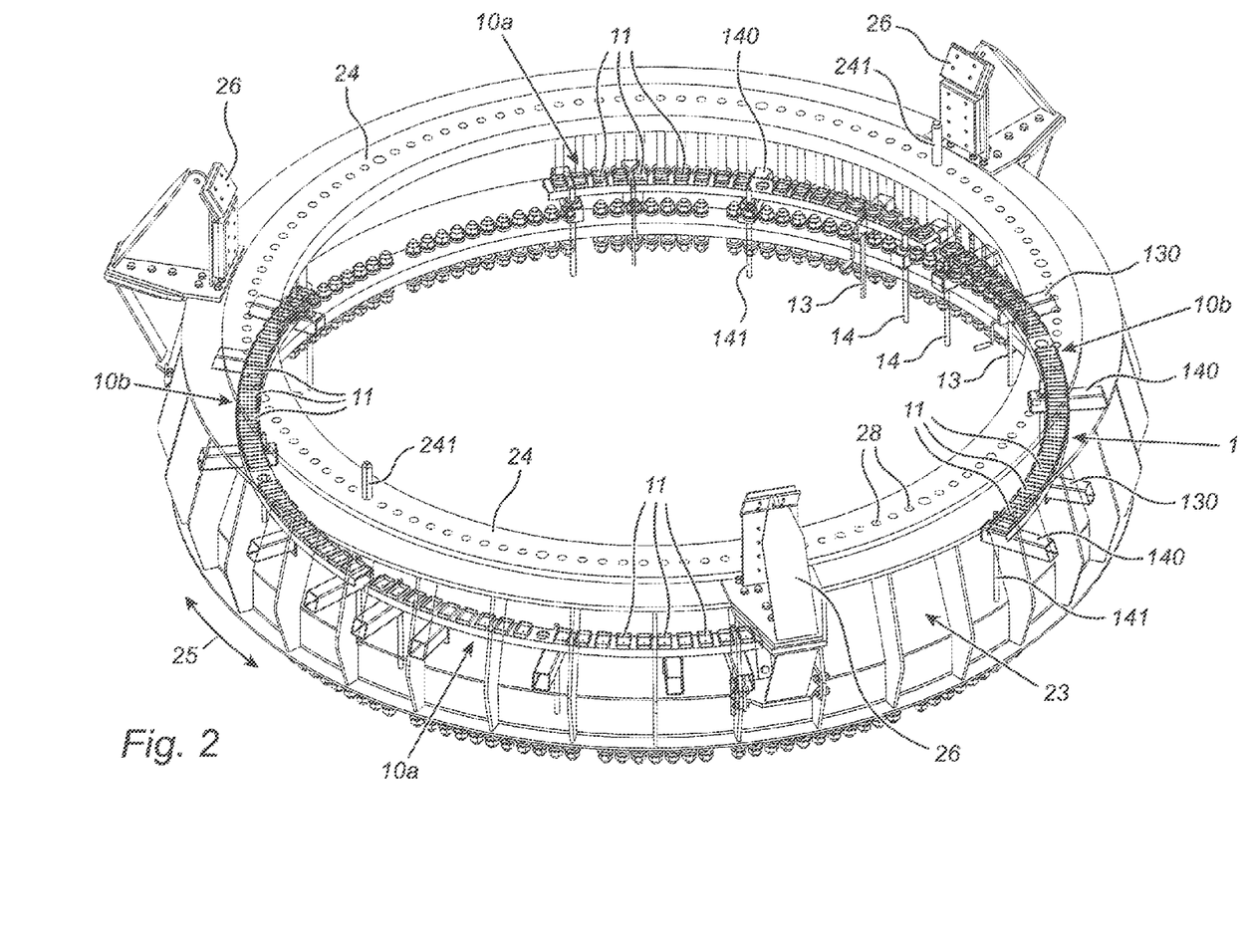
FIG. 2 is a schematic perspective view of an auxiliary device according to an embodiment of the invention.
Figure 3:
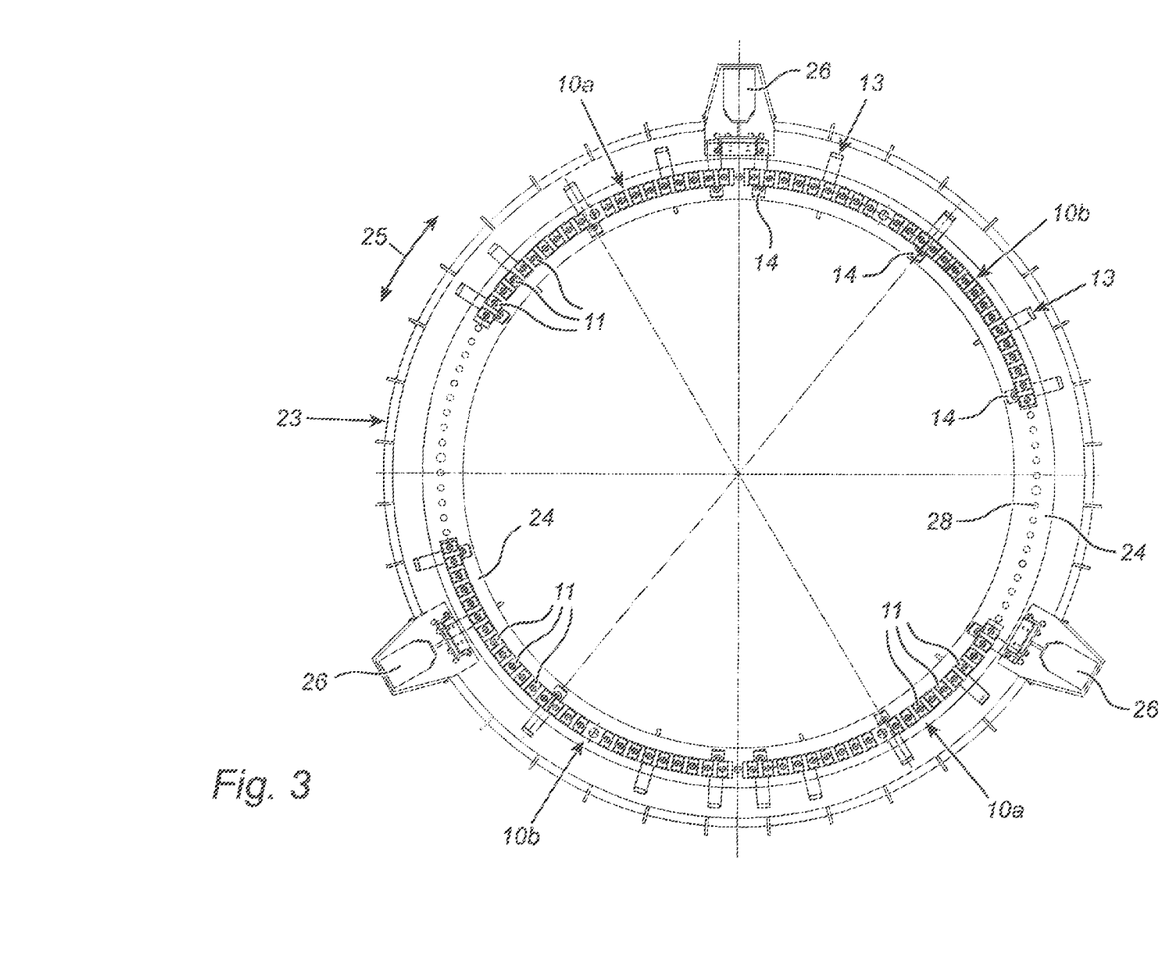
FIG. 3 is a schematic top view of the embodiment of the auxiliary device according to the invention shown in FIG. 2.

Referring to FIGS. 2 and 3, an embodiment of an auxiliary device 1 according to the invention is shown. In the shown embodiment auxiliary device 1 comprises four support bodies 10 (10a, 10b), a pair (10a, 10b) of which is placed almost against each other, as can be seen clearly in the top view of FIG. 3. The four support bodies 10 take the form of a circle segment spanning a peripheral angle of about 60° for the two support bodies 10a, and for the two other support bodies 10b an angle of about 80°. Support bodies 10 are received in seafastening ring 23 such that they substantially overlap with connecting flange 24 of seafastening ring 23.

A large number of bolt holes 28 distributed along the peripheral direction 25 is received in connecting flange 24 of seafastening ring 23. Each support body 10 is provided with a number of receiving positions 11, likewise distributed along peripheral direction 25, for a bolt 12. The distribution of receiving positions 11 is such that receiving positions 11 can be aligned with bolt holes 28 and with corresponding bolt holes in the connecting flange 34 of wind turbine mast 3 to be arranged against connecting flange 24.

Figure 4:
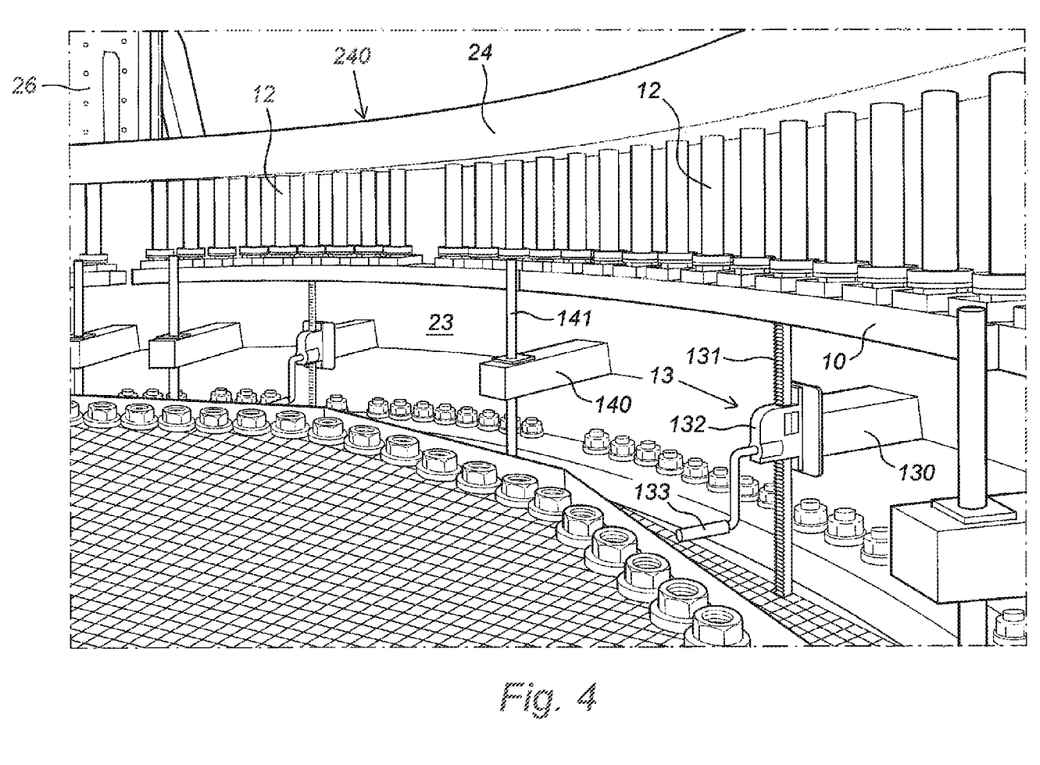
FIG. 4 is a schematic perspective view of a part of an auxiliary device according to an embodiment of the invention in retracted position.

This alignment can be achieved inter alia by connecting support bodies 10 to the seafastening ring 23 of wind turbine mast 3 by arranging moving means, welded onto an inner wall of seafastening ring 23, in the form of two gear transmissions 13 (per support body 10) at determined positions in peripheral direction 25. According to FIG. 4, the shown gear transmissions 13 comprise a second part in the form of a box beam 130 welded to the inner wall, a first part in the form of a gear rack 131 which runs in vertical direction to a position against support body 10 and is connected thereto, and a gearbox 132 in which is received a gear (not visible) driven with the crank 133. By rotation of crank 133 the support body 10 can be moved up and downward in vertical direction relative to the box beam 130 welded to seafastening ring 23. This movement can of course also be made possible in other manner, for instance under the influence of an electrically, pneumatically and/or hydraulically generated force, for instance with hydraulic piston cylinders.

In order to guide the up and downward movement each support body 10 is further connected with three guide means 14 for the relevant support body 10 to the inner wall of seafastening ring 23. According to FIG. 4, the shown guide means 14 comprise a box beam 140 welded to the inner wall and having an opening through which a vertically directed guide rod 141, welded to a side surface of support body 10, can be moved. Each guide rod 141 is secured on a lower side to a bottom part of seafastening ring 23. During the up and downward movement of a support body 10 guide rod 141 moves relative to box beam 140 and in this way keeps receiving positions 11 aligned with the corresponding bolt holes 28 in the connecting flanges (24, 34) to be placed against each other.

In order to enable a number of bolts 12 to be placed through bolt holes 28 simultaneously, a large number of bolts 12 is first arranged in receiving positions 11. The support bodies are here in a relatively low position, such as the position shown in FIG. 4. Support bodies 10 are preferably brought to a height wherein, although situated with a part thereof in bolt holes 28, bolts 12 do not rise above an upper surface 240 of connecting flange 24.

A wind turbine mast 3 is then taken up with a suitable lifting crane and carried with a connecting flange 34 to a position against connecting flange 24 of seafastening ring 23, until the upper surface 240 of connecting flange 24 and a lower surface of connecting flange 34 of wind turbine mast 3 lie against each other. The aligning of bolt holes 28 with corresponding bolt holes in connecting flange 34 of wind turbine mast 3 can be facilitated by pins 241 (see FIG. 2) arranged on connecting flange 24.

Figure 5:
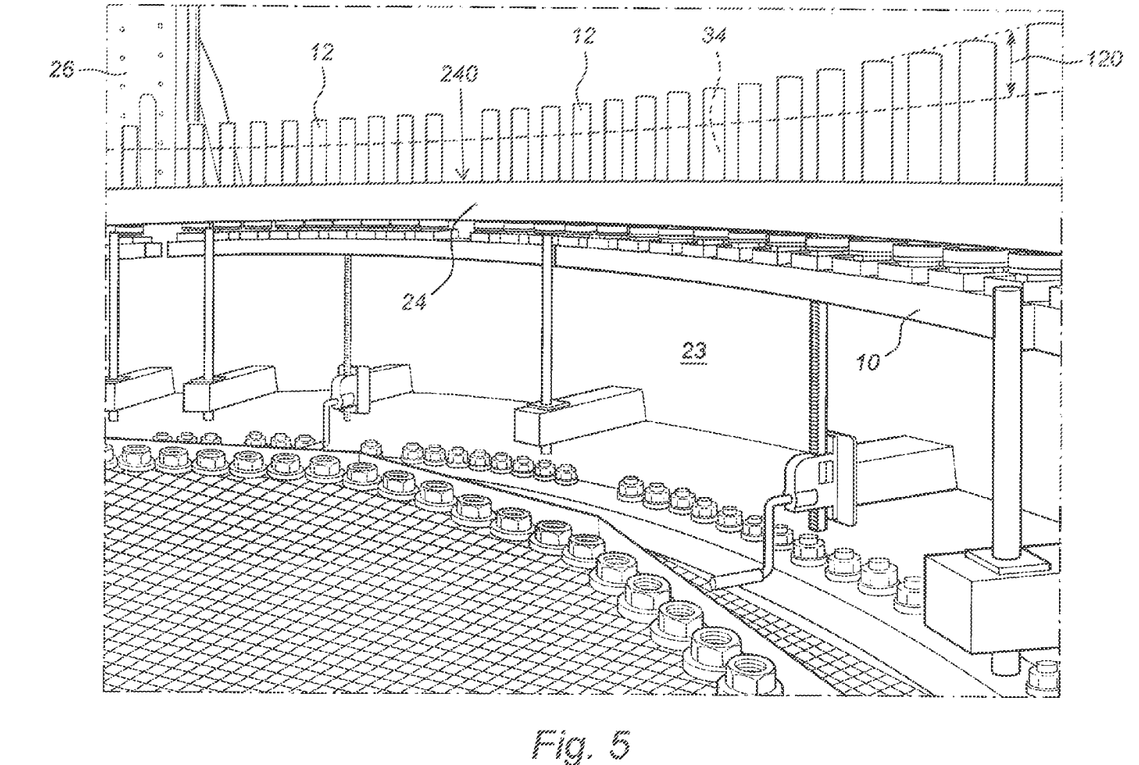
FIG. 5 is a schematic perspective view of the part of the auxiliary device shown in FIG. 4 in an extended position.
Figure 6:
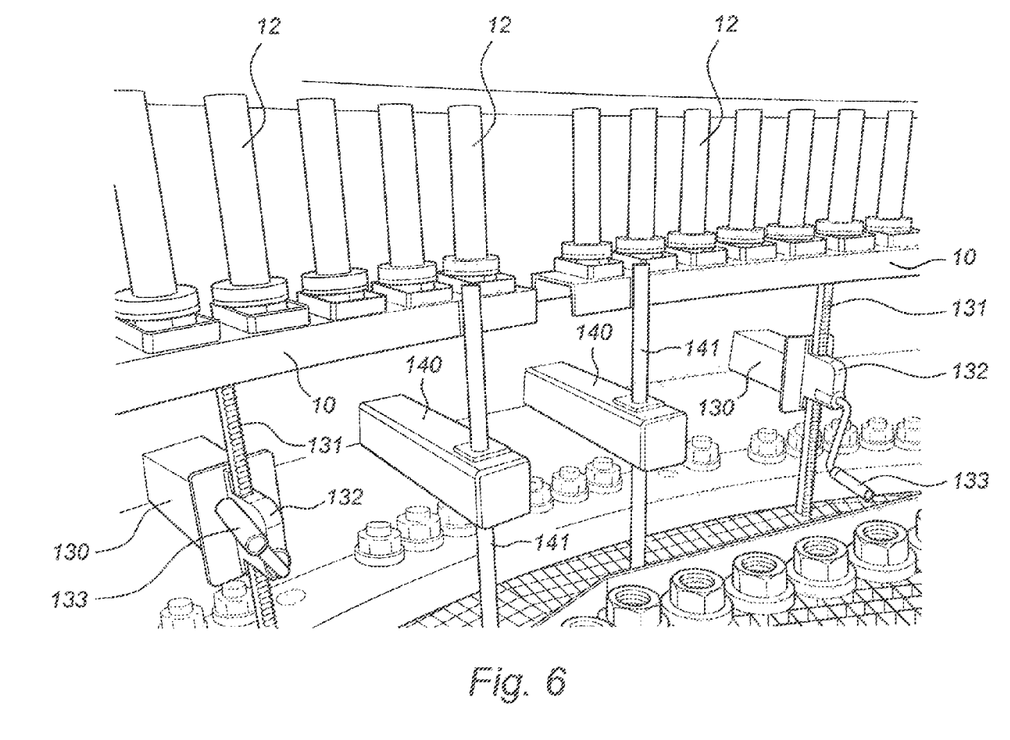
FIG. 6 is a schematic perspective detail view of an auxiliary device according to an embodiment of the invention.

The support bodies 10 provided with bolts 12 are then moved upward by rotation of cranks 133, i.e. in the direction of the mutually aligned connecting flanges 24 and 34 which are placed against each other. This upward movement of support bodies 10 is continued until the bolts 12 arranged in receiving positions 11 protrude substantially simultaneously through bolt holes 28 and through the corresponding bolt holes in connecting flange 34. This state is shown schematically in FIG. 5, in which connecting flange 34 of wind turbine mast 3 is shown with a broken line. In order to eventually realize the connection between the two connecting flanges (24, 34) the protruding parts 120 are each provided with a counter-nut (not shown).

With the invented auxiliary device 1 a large number of bolts 12 can be collectively arranged through bolt holes per support body. A large number can indicate any number, although the advantages of the invention become most clearly manifest when the number of bolts per support body 10 (or the number of receiving positions 11) is greater than 5, more preferably greater than 10, still more preferably greater than 15, still more preferably greater than 20, still more preferably greater than 40, still more preferably greater than 80, and most preferably greater than 100. An upper limit to the number of bolts per support body can in principle be determined only by practical conditions, such as for instance the overall weight of the support body with bolts, the dimensions of the connecting flanges, and so on.

The invention is not limited to the embodiments shown in the figures, and many variants thereof are possible within the scope of protection of the appended claims.

The invention claimed is:

1. An auxiliary device for realizing a bolt connection between connecting flanges, placed against each other, of a first and a second structure, comprising a support body provided with a number of receiving positions for a bolt, wherein the support body takes substantially the form of a circle segment for co-action with substantially circular connecting flanges, wherein the receiving positions are aligned with corresponding bolt holes in the connecting flanges to be placed against each other, and wherein the auxiliary device further comprises moving means for moving the support body toward the connecting flanges which are arranged against each other so that a number of bolts arranged in the receiving positions are collectively arranged through the bolt holes, wherein the support body is movably connected via the moving means to the first structure, and wherein a first part of the moving means, which is connected to the support body, can be moved relative to a second part of the moving means, which is connected to the first structure, under the influence of a mechanically, electrically, pneumatically and/or hydraulically generated force.

2. The auxiliary device according to claim 1, wherein the moving means comprise a gear transmission.

3. The auxiliary device according to claim 2, further comprising guide means for keeping the receiving positions aligned, during movement of the support body, with the corresponding bolt holes in the connecting flanges to be placed against each other.

4. The auxiliary device according to claim 2, wherein the support body extends substantially in a plane and the receiving positions are configured to receive a bolt protruding from the plane.

5. The auxiliary device according to claim 2, wherein the first structure comprises a support structure for a wind turbine mast and the second structure a wind turbine mast.

6. The auxiliary device according to claim 1, further comprising guide means for keeping the receiving positions aligned, during movement of the support body, with the corresponding bolt holes in the connecting flanges to be placed against each other.

7. The auxiliary device according to claim 6, wherein the support body extends substantially in a plane and the receiving positions are configured to receive a bolt protruding from the plane.

8. The auxiliary device according to claim 1, wherein the support body extends substantially in a plane and the receiving positions are configured to receive a bolt protruding from the plane.

9. The auxiliary device according to claim 1, wherein the first structure comprises a support structure for a wind turbine mast and the second structure a wind turbine mast.

10. The auxiliary device according to claim 9, wherein the support structure is connected to the deck of a vessel.

11. A method for realizing a bolt connection between connecting flanges, placed against each other, of a first and a second structure, comprising of providing an auxiliary device according to claim 1, placing connecting flanges of the first and second structure against each other, aligning the receiving positions of the support body with corresponding bolt holes in the connecting flanges placed against each other, and moving the support body toward the connecting flanges, arranged against each other, with the moving means, so that a number of bolts arranged in the receiving positions is collectively arranged through the bolt holes, wherein the support body is movably connected via the moving means to the first structure, and wherein a first part of the moving means, which is connected to the support body, is moved relative to a second part of the moving means, which is connected to the first structure, under the influence of a mechanically, electrically, pneumatically and/or hydraulically generated force.

12. The method according to claim 11, wherein the first part of the moving means, which is connected to the support body, is moved relative to the second part of the moving means by means of a gear transmission.

13. The method according to claim 11, wherein during movement of the support body the receiving positions are kept aligned with the corresponding bolt holes in the connecting flanges, which are placed against each other, using guide means.

14. The method according to claim 11, wherein the support body extends substantially in a plane and a bolt protruding from the plane.

15. The method according to claim 11, wherein the first structure comprises a support structure for a wind turbine mast, and the second structure a wind turbine mast.

16. The method according to claim 15, wherein the support structure is connected to the deck of a vessel.

* * * * *

UNITED STATES PATENT AND TRADEMARK OFFICE
CERTIFICATE OF CORRECTION

PATENT NO. : 10,920,443 B2  
APPLICATION NO. : 16/568713  
DATED : February 16, 2021  
INVENTOR(S) : Rabaut et al.

Page 1 of 1

It is certified that error appears in the above-identified patent and that said Letters Patent is hereby corrected as shown below:

On the Title Page

Item [71], delete "DEME Offshore Holding N.V." and insert -- DEME Offshore BE NV --

In the Claims

Column 9, Line 30, Claim 14, delete "plane." and insert -- plane is received in the receiving positions. --

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*